(12) United States Patent
Serowatka

(10) Patent No.: US 8,510,217 B1
(45) Date of Patent: Aug. 13, 2013

(54) INTERNET-CALLING CARD

(75) Inventor: John J. Serowatka, Elkins Park, PA (US)

(73) Assignee: Verizon Services Corp., Arlington, VA (US)

( * ) Notice: Subject to any disclaimer, the term of this patent is extended or adjusted under 35 U.S.C. 154(b) by 1529 days.

(21) Appl. No.: 10/818,138

(22) Filed: Apr. 5, 2004

(51) Int. Cl.
*G06Q 40/00* (2012.01)
*G06Q 40/02* (2012.01)

(52) U.S. Cl.
CPC ............... *G06Q 40/02* (2013.01); *G06Q 40/00* (2013.01)
USPC .............................................. 705/39; 705/35

(58) Field of Classification Search
USPC ....................................................... 705/35–45
See application file for complete search history.

(56) References Cited

U.S. PATENT DOCUMENTS

| | | | |
|---|---|---|---|
| 6,269,158 B1* | 7/2001 | Kim | 379/144.01 |
| 6,345,766 B1* | 2/2002 | Taskett et al. | 235/493 |
| 2001/0001856 A1* | 5/2001 | Gould et al. | 705/39 |
| 2002/0049669 A1* | 4/2002 | Bleser et al. | 705/39 |
| 2002/0091631 A1* | 7/2002 | Usui | 705/39 |
| 2003/0059592 A1* | 3/2003 | Jarvis et al. | 428/212 |
| 2004/0133511 A1* | 7/2004 | Smith et al. | 705/39 |
| 2006/0064379 A1* | 3/2006 | Doran et al. | 705/42 |

OTHER PUBLICATIONS

My Voicemail Network Tips Website. Mar. 27, 2004. http://web.archive.org/web/20040327064512/http://www.4mvn.com/tips.htm.*

Unix Manual Section Entitled Changing Your Password. Feb. 24, 2001. http://web.archive.org/web/20010224055526/http://www.unix-manuals.com/tutorials/unix/change-password/password-change.html.*

* cited by examiner

*Primary Examiner* — Shahid R Merchant
*Assistant Examiner* — Stephanie M Ziegle

(57) ABSTRACT

A pre-paid card, referred to as an Internet card, in accordance with the invention can be used to make anonymous payments over the Internet for services and products, e.g., to pay for Internet access and/or product purchases. The Card is purchased, e.g., with cash, from a card retailer, e.g., a convenience store. In some embodiments the card includes security information which is hidden from the retailer but can be viewed by the purchaser, e.g., after performing a tear off or scratch off operation to reveal the security information. The security information can be used to authorize a transaction to be charged against the card without the need to reveal any personal information and without the risk of the retailer making unauthorized purchases since the security information is hidden from the retailer. By avoiding the need for personal information privacy is maintained and the risk of identity theft avoided.

17 Claims, 5 Drawing Sheets

INTERNET-CALLING CARD

FIELD OF THE INVENTION

The present invention relates generally to the field of Internet services and, more particularly to methods and apparatus for supporting anonymous financial transactions, e.g., payment for purchases, over the Internet.

BACKGROUND

The Internet offers users access to purchase a wide range of services and products. Some of the services available include Internet Access, news or investment service subscriptions, sports, gaming sites, downloads of data/information, e.g., music, etc. Numerous products are available from a wide range of sources including manufacturer sites, retailer sites, discount or surplus supplier sites, auction sites, individuals, etc. In addition, many bills can now be paid directly over the Internet.

Typically, using currently employed known methods, a user pays for an Internet service or product using a credit card, check, or bank withdrawal over the Internet. Consumers without these capabilities must make other arrangements for payment and then track charges to meet any spending limits. Such other arrangements may include pre-paying a fixed amount, e.g., via a money order through the mail to a specific Internet service provider or sending a money order to a retailer through the mail after selection of a product. Such arrangements are inconvenient for the consumer and may result in significant delays between the selection of a service or product over the Internet and the consumer's access to a service or delivery of a product.

In cases where the user has the capability and chooses to pay via the Internet, the user's financial information, e.g., credit card number, PIN (personal identification number), verification information, etc. and/or personal information, e.g., name, address, social security number, date of birth, mother's maiden name, etc. is generally conveyed over the Internet. Consumers having concern for the safety of their personal and/or financial information may be reluctant to make purchases for services and products over the Internet. In addition, the user's personal and/or financial information may be stored on the computer inputting the payment request. Safety concerns may arise in a variety of areas. An individual's personal computer, with an imperfect firewall, may be subject to security breaches from hackers which may result in identity theft. An individual may be inputting the request from a personal computer site of questionable security, e.g., an internet café, a public library, a hotel's courtesy PC. Consumers may have concerns about supplying financial and/or personal information to entities and/or individuals that are not well-known, trusted, and/or established. Consumers may fear that significant unauthorized charges may occur on their credit card or account by one of these unknown entities. Concerns may also arise about supplying financial and/or personal information to Internet sites in remote locations, e.g., foreign countries.

These concerns may cause a potential consumer to pause and bypass the purchase of an Internet service or product, because it may seem that the security risk outweighs the benefit from the purchase. This may be particularly the case for relatively minor purchases. For this reason, in some cases, service providers may tend to offer services on a subscription basis, e.g., a yearly Internet subscription to a newspaper or magazine, and not offer the purchase of an individual issue over the Internet. Such restrictions may limit potential sales and drive some consumers to other sources, e.g., newsstands, or to simply decide not purchase the service or product.

In addition to security concerns, customers may also have privacy concerns which tend to limit purchases of services and products over the Internet. The customer may not wish to divulge personal information when purchasing a service or a product. The customer may not wish for information to be collected which may be used to target the individual with various forms of unsolicited advertising, offers, and/or requests, e.g., phone calls, E-mails, mailings, sample products, sample offers, requests for contributions, etc.

Based upon the above discussions it should be appreciated that there is a need for new methods and apparatus that allow consumers without credit cards and/or established lines of credit to purchase services and goods over the Internet. In addition, new methods and apparatus that allow a consumer to purchase services and goods over the Internet without having to divulge financial and/or personal information would be beneficial for the consumer.

New methods and apparatus that increase the consumer's confidence in terms of an individual's security and privacy regarding Internet purchases would also be beneficial for service providers and sellers. This could be particularly advantageous for Internet sites offering inexpensive individual purchases, e.g., the purchase an Internet copy of a magazine or newspaper, the purchase of an individual report such as a stock analysis report or a vehicle's title history report, the purchase of downloading a music file, etc.

In the field of telephone service, providers have offered telephone calling cards for voice calls, offering consumers with an alternative to standard long-distance contracts. The telephone calling cards allow a caller to pre-pay for a fixed amount of phone service without the need for a credit card, credit rating, or long-term contact. These voice calling cards are currently sold in many convenience stores, gas stations, etc. In the retail industry, many individual retailers, have sold "gift cards" allowing an individual to pre-pay for a fixed amount of a retailer's goods. In some cases, e.g., with "mall gift cards" these retail gift cards may be accepted as payment by multiple retailers. Telephone service cards and "gift cards" are beneficial for the service providers and retailers because they have secured and locked-in pre-payment for their goods and services. In addition, it is likely that a percentage of these cards will be lost or misplaced prior to depletion of their full pre-paid amount. Since, many of these cards are purchased with cash, such consumer losses may represent profit to the service provider or retailer.

Based upon the above discussions, it should be appreciated that there is a need for variations of the calling card or gift card in the field of Internet purchases of goods and services. Any gift type card, is a very liquid asset, and may be targeted for fraud or theft; therefore, it should be appreciated that there is a need for novel security methods and apparatus to safeguard such a card.

SUMMARY

The present invention is directed to an Internet purchase card and methods and apparatus for using such a card. An Internet Purchase Card (e.g., an Internet Card), in accordance with the invention, is a pre-paid card whose monetary value can be used for making purchases and/or payments over the Internet for various services, levels of access, products, and/or bills. Such Internet purchases may include on-line subscription services, one time purchases of reports, data, and/or information, purchases of products offered over the Internet, temporary access to Internet sites, and/or temporary access to Internet service. In addition, in some embodiments, an Internet Card may be used for traditional telephone calling as with a standard telephone calling card.

In some embodiments, an Internet Card may be available in fixed denominations, e.g., $10, $20, $50 denominations and the amount may be printed on the Internet Card. In other embodiments, the specific pre-purchased amount may be variable, selected by the consumer, and stored in a database at the time of purchase of the Internet Card. In some embodiments, the Internet Card shall be considered activated when delivered to the retailer or point of sale of the card, e.g., a convenience store or gas station. In some embodiments, the retailer or point of sale may activate cards prior to sale, e.g., activating a block of cards expected to be sold during the day by sending information to a database. In other embodiments, the retailer or point of sale of the card goes through an activation sequence sending information, e.g., barcode information, a card number, a pre-paid amount, an activation date, etc., to a database during the selling process for each card.

In some embodiments, the card includes security information, e.g., an access number, that is not visible to the retailer of the card at the time of sale. Such security information may be hidden by packaging, scratch off coatings, peel-off covering material, or other means. In some embodiments, the purchaser of the Internet Card may supply the retailer of the card with additional security information, e.g., an additional PIN number to enter into the access database at the time of sale. In some embodiments, the purchaser of the Internet Card may supply the firm, company, or institution backing the card with additional security information, e.g., a PIN number, via access through a Web site.

The Internet Card may purchased, e.g., with cash, and used by consumers who do not have a credit card or do not have access to a line of credit. The Internet Card may also be purchased and used by consumers who do not want to use a personal credit card to acquire goods and services over the Internet for a variety of reasons including security and privacy issues.

The Internet Card service uses databases for card initiation and account administration, in accordance with the invention. The Internet Card database is coupled to existing financial networks, e.g., credit card/debit networks, various banking networks, etc. In some embodiments, the database structure used for standard telephone calling cards, has been enhanced, in accordance with the invention, such that it utilizes a communications network and service provider to access an electronic funds transfer network for paying multiple retailers/service providers.

In some embodiments, a consumer may reprovision a previously purchased Internet Card, e.g., a depleted card or partially depleted card, at a card retailer, e.g., by supplying the card access number and pre-paying additional funds. In such a case the consumer need not supply any security information unique to the card, e.g., a security code supplied on the card and/or a PIN number currently associated with the card.

The present invention is directed to a system and method for supporting anonymous payments for Internet related purchases. The method includes activating an Internet purchase card and receiving purchase information. Activation of an Internet purchase card for an amount paid for, e.g., with cash, by a user of said Internet purchase card may occur without receiving information identifying the user of said card, said activating including updating a database, e.g., an Internet card control network database, to indicate the amount of money available for purchases using said Internet purchase card. In some embodiments, the amount of money may be a fixed amount, e.g., $20, printed on the Internet purchase card. In some embodiments, the amount of money associated with the card is selected at the time the Internet purchase card is purchased. Subsequent to card activation, a user may make anonymous purchases with the Internet purchase card. During an Internet purchase transaction, information is received, e.g., received and processed by an Internet card control network. Such received information during a purchase transaction includes i) information identifying said Internet purchase card, e.g., a card identification number and card security information ii) information identifying the amount of a purchase to be paid for using said Internet purchase card, e.g., information indicating the purchase price plus any transactional costs iii) information indicating to where funds to pay for said purchases are to be sent, e.g., a bank routing number, business, corporation, etc.

In some embodiments, the method further comprises requesting fund transfer authorization information from the user of said Internet purchase card, receiving response information, and comparing at least a portion of said received response information to security information associated with said Internet purchase card, e.g., security information that is stored in the Internet Card control network database, required to authorize a fund transfer to determine if there is a match between said security information and said portion of said received response information; and implementing a fund transfer to pay for said purchases when it is determined that said security information matches said portion of said received response information. For example, the Internet service provider/retailer, as part of the purchase transaction, may request the card user to supply authorization information, e.g., a card identification number and card unique security information. The response information from the card user may be forwarded to an Internet Card control network where checks are made to existing records in a database to verify that the received information matches database information. If the match is successful, the Internet card control network may convey authorization to a financial network to facilitate the requested funds transfer.

The method further comprises, prior to implementing, the fund transfer, checking to determine if the amount of said funds to pay for said purchase exceeds the amount of money available for purchases using said Internet purchase card. A fund transfer may be performed when the check determines that said amount of money available for purchases, e.g., a present (or remaining) account balance of the Internet purchase card stored in the Internet Card control network database, at least equals said amount of funds to pay for said purchase. If the fund transfer request amount exceeds the current account balance, authorization may be denied. In some embodiments, if the fund transfer request amount exceeds the current balance corresponding to the Internet purchase card identified in the request, the user may be prompted to optionally supply card identification information corresponding to a second Internet purchase card, and the funds available on both cards may be taken into consideration in transaction decisions.

In some embodiments, the Internet purchase card includes security information which is not visible to a seller of the Internet purchase card, and the user of the Internet purchase card removes a covering material covering said Internet purchase card security information, revealing said security information. For example, the covering material may be a scratch-off coating and the user scratches off the coating revealing the hidden security information prior to making a purchase transaction request. As another example, the covering material may be, e.g., a perforated paper material or an adhesive decal, and the user peels-off the covering material to reveal the security information prior to making a purchase transaction request.

In some embodiments, the method of operation further comprises receiving security information associated with the Internet purchase card from a card user. This user supplied security information may be in addition to or in place of the card supplier provided security information associated with the specific Internet purchase card. For example, security information, such as a unique user selected PIN or password, may be received at the time of purchase of an Internet purchase card and stored in a Internet card control network database for future verifications; alternatively or in addition, security information may be conveyed, subsequent to the purchase of an Internet purchase card, from a card user via the Internet and received and stored in the database for future verifications. In such embodiments, such receiving of security information, e.g., by an Internet card control network, from a user may be part of the process of activating the Internet purchase card.

In some embodiments, the step of receiving purchase information includes operating a credit card processing facility to receive said purchase information and initiating a fund transfer to pay for said purchases. In some embodiments, an existing credit card processing facility acts an intermediary through which Internet service providers/retailers forward requests for payment to the Internet Card control network, and receive information indicating that the fund transfer has been approved and completed or denied.

DETAILED DESCRIPTION

Figure 1:
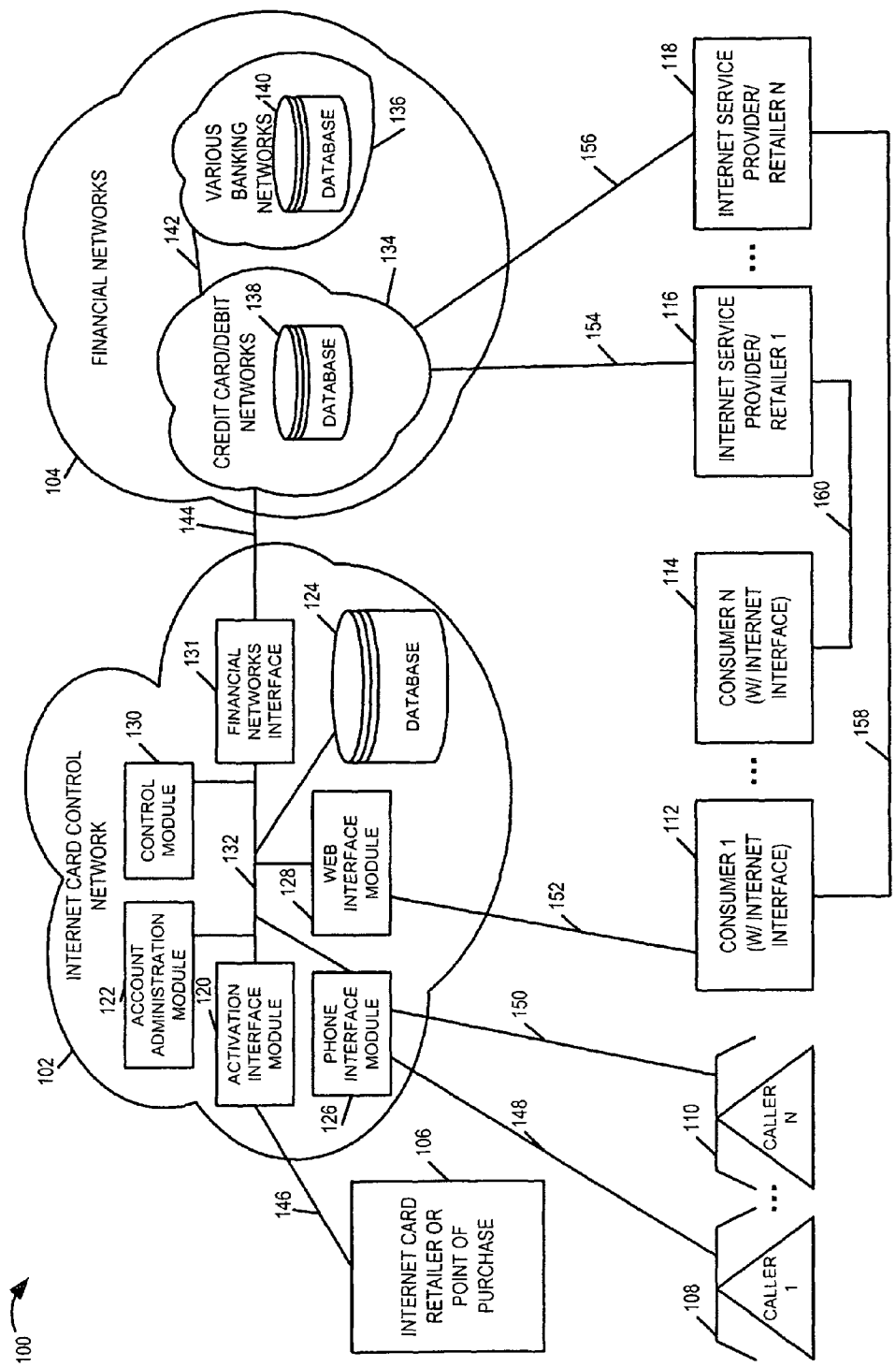
FIG. 1 is a drawing of an exemplary system implemented in accordance with the present invention and using the methods of the present invention.

FIG. 1 is a drawing of an exemplary system 100 implemented in accordance with the present invention and using the methods of the present invention. Exemplary system 100 includes an Internet Card control network 102, financial networks 104, an Internet Card retailer or point of card purchase 106, a plurality of callers (caller 1 108, caller N 110), a plurality of consumers with an internet interface (consumer 1 112, consumer N 114), and a plurality of Internet service providers/retailers (Internet service provider/retailer 1 116, Internet service provider/retailer N 118).

Internet Card control network 102 includes an activation interface module 120, an account administration module 122, a database 124, a phone interface module 126, a web interface module 128, a control module 130, and a financial networks interface 131. The various elements 120, 122, 124, 126, 128, 130, 131 are coupled together via bus 132 over which the elements may interchange data and information.

Activation interface module 120 is coupled to the Internet Card retailer 106 via link 146. Internet Card retailer 146 may convey card activation information such as, e.g., a card identification number, a card denomination value, a retailer identification number, a date of sale, a user supplied PIN #, etc. to the activation interface module 120. Some or all of the activation information communicated may be obtained from encoded information on the Internet Card and may be obtained by scanning the card. The activation interface module 120 updates its network database 124 with the transferred information and sets the card's status to active. In some embodiments, card retailer 106 activates cards at the time of sale to a customer. In other embodiments, card retailer 106 may activate cards prior to sale, e.g., a card retailer activates a block of fixed denomination cards, expected to be sold during the day, at the start of the day. In still other embodiments, the cards are delivered active to the card retailer 106. The activation link 146 may be via a phone connection and/or the Internet and the data/information transferred may be encrypted information. The activation interface module 120 may send a confirmation message to the retailer 106 when activation is successfully completed.

Account administration module 122 performs updates to each of information sets (records) stored in database 124 corresponding to an activated Internet Card. The account administration module 122 responds to authorization requests for funds from the financial networks 104, makes authorization decisions, and updates the database records 124 accordingly. For example, if a request for funds is approved, account administration module 122 may subtract the amount of funds requested from a current balance for the card, store the new current balance, and store purchase information.

Phone interface module 126 is shown coupled to caller 1 108 and caller N 110 via links 148, 150, respectively. Caller 1 108 and caller N 110 have each purchased a Internet Card and are using the card as a typical caller card. Caller 1 108 and caller N 110 calls are being routed through phone interface module 126 to their requested destination and/or phone interface module 126 is being notified of call activity pertaining to callers 108, 110. Phone interface module 126 may correspond to a centralized phone number associated with the Internet Card. Billing information collected related to the calls is forwarded by phone interface module 126 to account administration module 122 for processing and updating of database 124.

Web interface module 128 is shown coupled to any exemplary Internet user, consumer 1 112. Consumer 1 112 and consumer N 114 have each purchased an Internet Card and are using the card for payment of services, products, and/or bills via the Internet. Web Interface module 128 provides a Web portal through which users, e.g., consumer 1 112, may check the account balance on their Internet Card. In addition, in some embodiments, additional security information such as a user supplied password or PIN number may be entered through the Web Interface module 128 and stored in the record in database 124 associated with the specific card. Such additional security information may be utilized for authorization verifications in future transactions.

Control module 130 includes a processor and memory including routines and data/information. Control module 130 controls overall operation of the Internet Card control network 102 in accordance with the invention. Control module 130 directs and/or coordinates the operation of the interfaces 120, 126, 128, 131 and account administration module 122, implements various communications protocols, and performs various security functions including encryption of data/information.

Financial networks interface 131 provides an interface to financial networks, e.g. existing financial networks, via link 144. Financial services network 131 may receive and process authorization requests of Internet Card funds through a credit card network.

Financial networks 104 includes credit card/debit networks 134 coupled to various banking networks 136 via link 142. Credit card debit networks 134 include a database 138. Credit card/debit network 134 is coupled to the Internet service providers/retailers 116, 118 via links 154, 156, respectively, and may act as an intermediary for conducting funds transactions and transfers when an Internet Card is being used for payment over the Internet. Links 154, 156 may be Internet links and/or other financial services links, e.g., a phone line using existing credit card interface equipment, protocols, and encryption.

Banking networks 136 includes a database 140. Database 140 includes accounts corresponding the internet service providers/retailers 116, 118, the retailers of the Internet Card, and the company issuing the Internet Card. In some embodiments, when a card is activated by a card retailer 106, e.g., at the time of sale to a consumer, funds are transferred from the card retailer's 106 bank account to the card issuing company's bank account, and when a payment is made by the consumer over the Internet, funds are transferred from the card issuing company's bank account to the Internet service provider/retailer bank account.

Consumer 1 112, consumer N 114 are shown coupled to exemplary Internet service provider/retailer N 118, Internet service provider/retailer 1 116 via link 158, 160, respectively. Links 158, 160 represent paths for Internet signaling and may include standard telephone service lines, cable lines, DSL lines, fiber optic lines, modems, switches, routers, etc.

Figure 2:
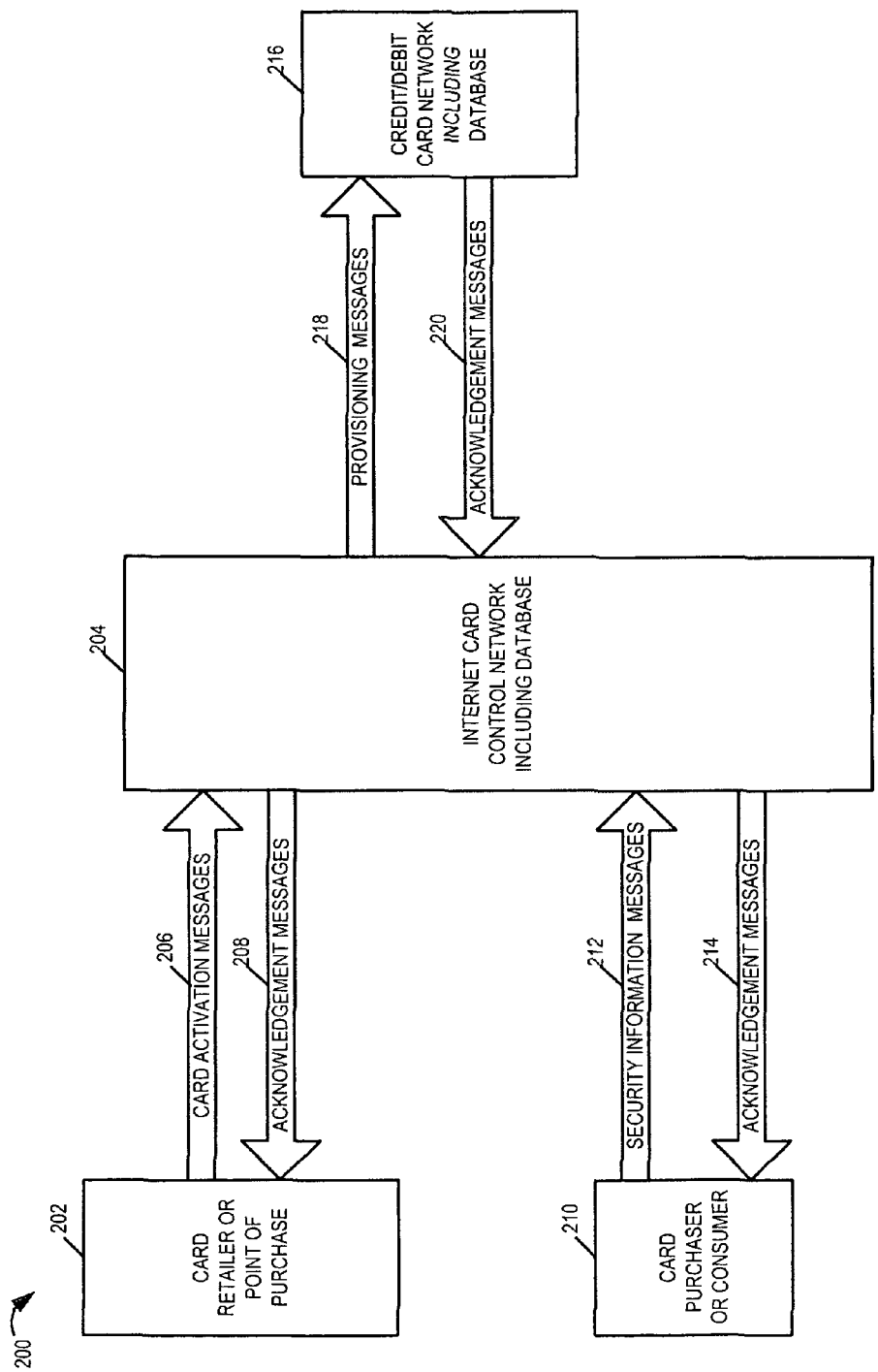
FIG. 2 is a drawing illustrating exemplary signaling used to perform Internet Card activation in accordance with the present invention.

FIG. 2 is a drawing 200 illustrating exemplary signaling used to perform Internet Card activation in accordance with the present invention. FIG. 2 includes an exemplary card retailer or point of purchase 202 of the Internet Card, a card purchaser or consumer 210, an Internet Card control network 204, and a credit/debit card network 216. Card retailer 202 may be a representation of card retailer 106 of FIG. 1; card purchaser or consumer 210 may be a representation of consumer 1 112 of FIG. 1; Internet Card control network 204 may be a representation of Internet Card control network 102 of FIG. 1; credit card/debit network 216 may be a representation of credit card/debit networks 134 of FIG. 1.

In some embodiments, the card retailer 202 activates each Internet Card at the time of card purchase by a consumer. The card retailer 202 transfers data/information to the Internet Card control network 204 via messages 206. Such transferred information is stored in a record of the database for control network 204. In some embodiments, some or all of the information transferred in messages 206 is obtained automatically, e.g., via scanning of the card being sold. In some embodiments, some or all of the information being transmitted in messages 206 is entered by the retailer 202 into an interface device. Messages 206 may include card identification information, e.g., a serial number or identification number associated uniquely with the card, information identifying the retailer, e.g., an identification number such as a tax number, a card denomination, the date of activation, an expiration date, a unique PIN number supplied by the consumer, etc. In some embodiments, the card denomination value is a nominal fixed value, e.g., $10, $20, $50 associated with the card by the issuer of the card, while in other embodiments, the card denomination may be a variable pre-paid value, e.g., $22, $37, etc. selected by the purchaser of the card, entered by the card retailer 202 into an interface device, and communicated in messages 206 to be stored in a database of control network 204. Upon successful completion of the activation of the card, control network 204 sends an acknowledgement message 208 to the card retailer.

In some embodiments, a card retailer 202 may activate cards prior to sale to a consumer. For example, a card retailer 202 may activate a block of cards with fixed pre-selected denominations at the start of a business day, e.g., the number of cards expected to be sold during the business day.

In some embodiments, additional security information may be entered by a card purchase or consumer 210 subsequent to the card purchase via the Internet. The card purchaser or consumer 210 may access a Web site of the card issuer's control network 204 and enter additional security information, e.g., a PIN number or password. Such user selected security information may be sent via security information messages 212 and may replace part of the card issuer's security information or may supplement security information to be used in addition to the card issuer's security information. Acknowledgement messages 214 are sent by control network 204 to the card purchaser 210 in response to security information messages 212 to confirm acceptance and storage of the new security information. The security information conveyed in messages 212 may be used in access decisions for funds requests pertaining to the Internet Card. The entering of additional security information may be beneficial to a purchaser of the card, who subsequently loses the card. In such a case, the funds remaining on the card could not be accessed by someone else finding the card. The card purchaser who lost the card, if he had retained the receipt, could return to the card retailer, supply the user entered security information for verification, and obtain a refund or replacement card.

In some embodiments, Internet Card control network 204 maintains a record in its database for each card sold and performs accounting functions when each subsequent payment request occurs using the card, e.g., an Internet payment of a service, product or bill or a phone call.

In other embodiments, after activating a card, the Internet Card control network 204 transfers activated card record information to a credit/debit card network 216 via provisioning messages 218. In such an embodiment, the credit/debit card network 216 may store the transferred information in its database and assume responsibility for future accounting related to the card. In such an embodiment, the Internet Card issuer may set up debit and/or credit accounts with a partner credit card company in its own name and linked to its bank account, each authorized card having a set pre-paid limit not to be exceeded. Provisioning messages 218 may include information communicated in card activation messages 206 and additional security information known by the card issuer and card purchaser, e.g., hidden information, e.g., a password, not visible to the card retailer 202. Credit/Debit Card network 216 issues acknowledgement messages 220 to the Internet Card control network 204 in response to provisioning messages 218. Such acknowledgement messages 220 may be used to signify the successful transfer of an activated card's record information.

Figure 3:
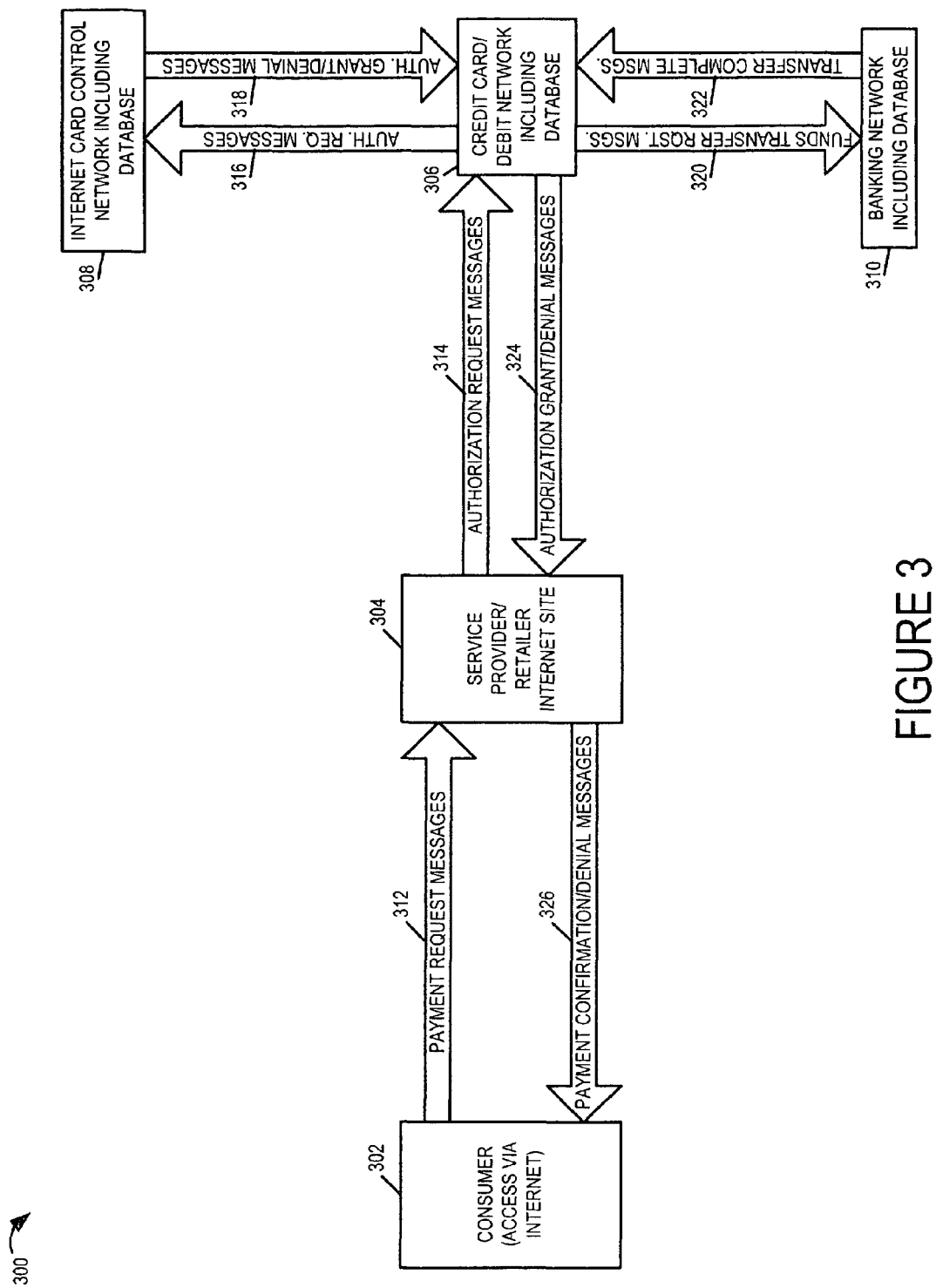
FIG. 3 is a drawing illustrating exemplary signaling used in processing a payment request and funds transfer over the Internet in accordance with the present invention.

FIG. 3 is a drawing 300 illustrating exemplary signaling used in processing a payment request and funds transfer over the Internet in accordance an exemplary embodiment of the present invention. FIG. 3 includes a consumer 302, a service provider/retailer internet site 304, a credit card/debit network 306 including a database, an Internet Card control network 308 including a database, and a banking network 310 including a database. Consumer 302 may be a representation of consumer N 114 of FIG. 1; service provider/retailer Internet site 304 may be a representation of Internet Service provider/retailer 1 116 of FIG. 1; credit card/debit network 306 may be a representation of credit card/debit networks 134 of FIG. 1; Internet Card control network 308 may be a representation of Internet Card control network 102 of FIG. 1; banking network 310 may be a representation of various banking networks 136 of FIG. 1.

Assume consumer 302 has previously purchased an Internet Card which has been previously activated and currently has sufficient funds remaining for the intended transaction. Consumer 302 is interacting with service provider/retailer Internet site 304 over the Internet and decides to purchase an Internet Service, e.g., a financial report on a corporation. As part of the interaction, a request for funds transfer is forwarded to consumer 302. Consumer 302 sends payment request information message 312 to service provider 304 including, e.g., a number associated with the Internet Card, a security access password, and an authorized transaction amount. The service provider 304 forwards received information from message 312 along with information identifying itself, e.g., a name or identification number and a bank account routing number in which the funds should be deposited, in authorization request messages 314 to credit card/debit card network 306. The credit card/debit network associates the card identification information with the card issuer, and forwards authorization request messages 316 to the Internet Card control network 308. Control network 308 processes the request, accesses the record in its database corresponding to the specific card, verifies the security information supplied, verifies that there are sufficient funds in the account for the amount requested, subtracts the amount requested plus processing fees from the account balance, stores a set of purchase information, stores a new account balance, and sends an authorization grant for funds in authorization grant/denial message 318. Credit card/debit network 306 receives the grant in message 318 and sends a funds transfer request message 320 to banking network 310. The banking network 310 processes the message 320 and transfers funds from an account assigned to the Internet Card issuer to an account designated by the service provider 304. Upon completion of the funds transfer, the banking network 310 sends a transfer complete message 322 to the credit card/debit card network 306. In response to reception of the transfer complete message 322, the credit card/debit card network 306 sends an authorization grant in authorization grant/denial message 324 to service provider 304. Subsequently, the service provider sends a payment confirmation in payment confirmation/denial message 326 to consumer 302 completing the transaction.

Other variations of signaling, e.g., different numbers of messages, different grouping of information conveyed in each message, different sequences of messages, etc. are possible in accordance with the invention.

Figure 4:
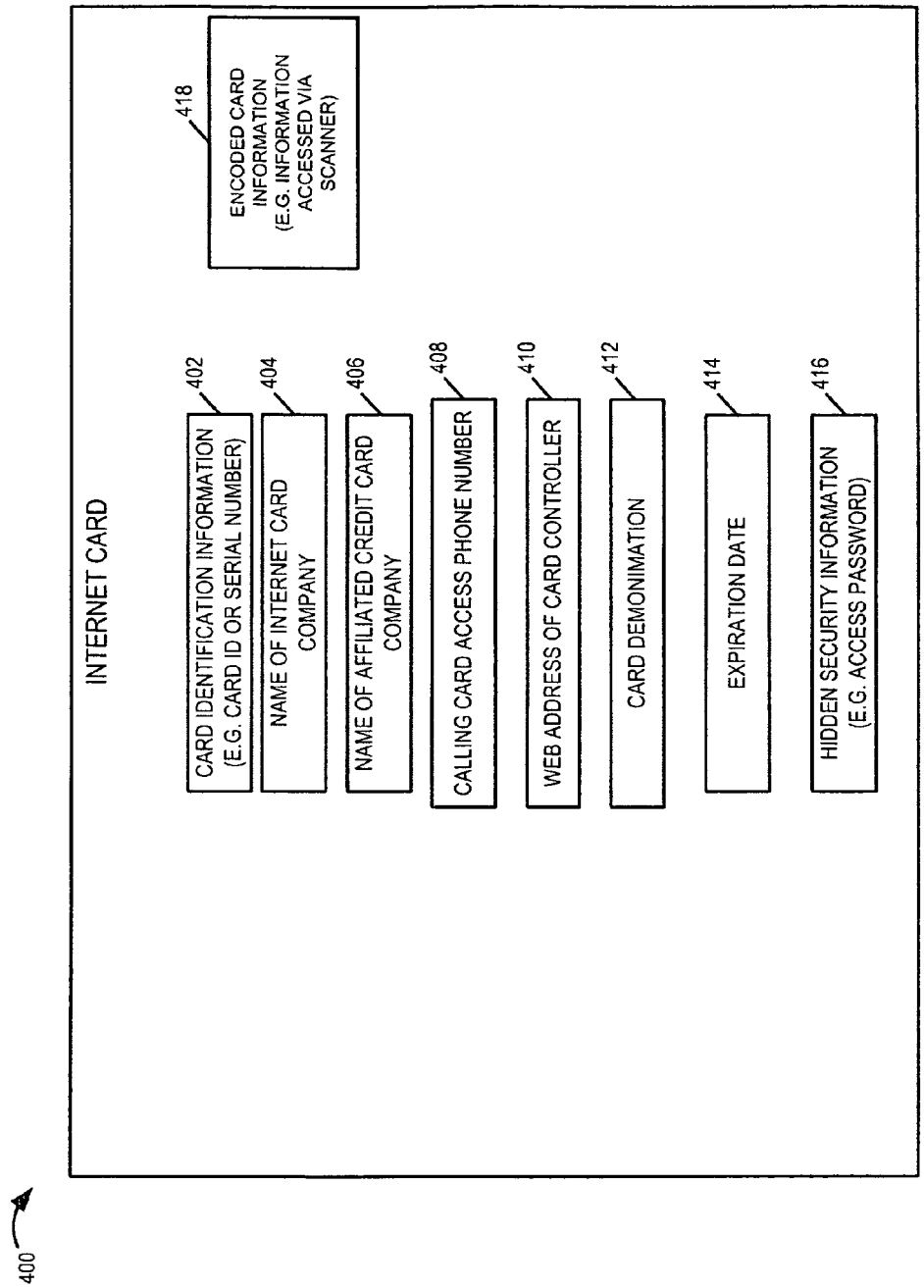
FIG. 4 is a drawing of an exemplary Internet Card in accordance with the present invention.

FIG. 4 is a diagram 400 of an exemplary Internet Card 400 in accordance with the invention. Card 400 includes card identification information 402, a name of the Internet Card Company 404, a name of an affiliated credit card company 406, a calling card access phone number 408, a web address of card controller 410, a card denomination 412, an expiration date 414, hidden security information 416, and encoded card information 418.

Card identification information 402 may include an identification number unique to each card, e.g., a 16 digit identification number similar to a credit card/debit card number. The name of the Internet Card Company 404 is the name of the card issuer and/or the name of the company operating the card control network, e.g., Verizon. The name of the affiliated credit card company 406 may be, e.g., VISA, Master Card, Discover Card, American Express, etc. In some embodiments, the name of the affiliated credit card company 406 may be used (e.g., selected off a pull-down menu) by the consumer when using card 400 to make a payment via the Internet, and the interaction may appear transparent or very similar to the procedure followed with a regular credit card/debit card, except the user need not be prompted and need not enter personal identification information or personal financial information. The calling card access phone number 408 is a card issuer phone number used for routing telephone calls intended to be charged to the Internet Card 400. The Web address of card controller 410 is an address of a Web site that may be used to obtain account balance information on card 400 and, in some embodiments, for the purchaser of the card to enter additional security information. Card denomination 412 is the pre-paid amount associated with card 400. In some embodiments, the card denomination 412 may be a pre-set amount, fixed by the card issuer. In other embodiments, the card denomination 412 may be a variable pre-payment amount, selected by the purchaser of the card, set, and optionally printed on the card, at the time of purchase. Expiration date 414 is a date included specifying the last date when the funds may be accessed. In some embodiments, the expiration date is set at a value far into the future, e.g., 10 years into the future, and is included for the purpose of compatibility with existing credit/debit card Internet entry interfaces. Hidden security information 416 is, e.g., an access password, access number, encryption key, etc., and is hidden from the card retailer at the time of sale. Hidden security information 416 may be hidden by various means, e.g., external packaging covering visibility of the information, scratch off coatings, peel-off material, tear off covers, seals, etc. In some embodiments, the Internet Card 400 may include a set of cards packaged together, one card including the card identification information 402 and another card including the hidden security information 416. Matching information to hidden security information 416 has been pre-loaded in the card issuer's database records for subsequent verification, e.g., during a purchase over the Internet. Encoded card information 418 may include card identity, denomination, security, and/or expiration information which has been encoded, e.g., into barcodes, to be read by an interface device at the card retailer and conveyed to the card issuer at the time of card activation.

Figure 5:
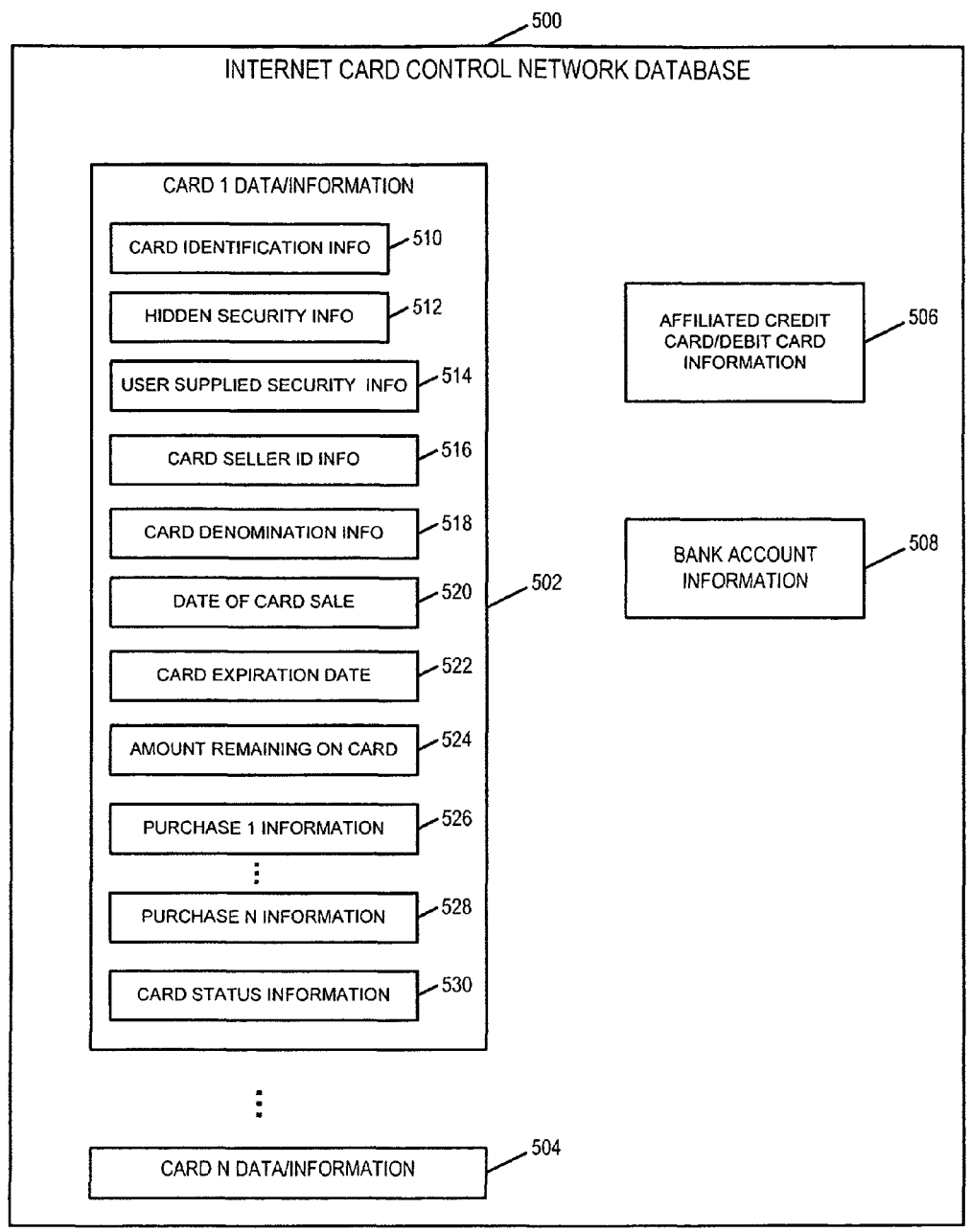
FIG. 5 is a drawing of an exemplary Internet Card control network database in accordance with the present invention.

FIG. 5 is a drawing of an exemplary Internet Card control network database 500 in accordance with the present invention. Database 500 may be a representation of database 124 of FIG. 1. Database 500 includes a plurality of card data/information, card 1 data/information 502, card N data/information 504, affiliated credit card/debit information 506, and bank account information 508.

Card 1 data/information 502 includes card identification information 510, hidden security information 512, user supplied security information 514, card seller identification information 516, card denomination information 518, date of card sale 520, card expiration date 522, amount remaining on card 524, a plurality of purchase information, purchase 1 information 526, purchase N information 528, and card status information 530. Card identification information 510, e.g., a unique identification number for card 1 corresponds to the card ID information 402 on the card 400. Hidden security information 512 corresponds to the hidden security information 416 on card 400. User supplied security information 514, may be, e.g., a PIN or password supplied by the purchaser of the card via the card issuer's Web interface. Card seller identification information 516 is information, e.g., a name, address, tax number, bank account number, associated with the card retailer. Card denomination information 518 corresponds to card denomination 412 of card 400 and represents the pre-paid starting balance value of the Internet Card 400. Card expiration date 522 corresponds to expiration date 414 on card 400. Amount remaining on card 524 represents the current available balance of the card. Purchase 1 information 526 includes information identifying the recipient, bank account to which funds were transferred, amount of transfer, transaction charge, and/or transaction time tag information which correspond to transaction 1 for Internet Card 1. Purchase N information 528 includes information identifying the recipient, bank account to which funds were transferred, amount of transfer, transaction charge, and/or transaction time tag information which correspond to transaction N for Internet Card 1. Card status information 530 includes information identifying the present status of Card 1, e.g., an unactivated new card at a card retailer, a card being activated, an activated card with funds available, a depleted card, a cancelled card.

Affiliated credit card/debit card information 506 includes information used by the controlling network of the Internet Card to interact with financial networks, e.g., routing information, security information, account number information, etc. used by a credit card network affiliated with the Internet Card issuer. Bank account information 508 includes information identifying account(s) held by the issuer of the used for funding purchases on the Internet Card, information identifying accounts held by the card retailers for paying the card issuer for each activated card when sold, and information identifying accounts of Internet service providers/retailers to which funds are transferred in response to a card holder's (consumer) request for payment via the Internet.

In some embodiments, various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., a general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are considered to be within the scope of the invention.

What is claimed is:

1. A method for supporting anonymous payment for an Internet related purchase, the method comprising:
    operating a control module including a processor and memory to activate a first Internet purchase card for an amount paid for by a user of said first Internet purchase card, without receiving information identifying the user of said card, wherein the first Internet purchase card includes first security information that is covered by a scratch-off coating or adhesive decal at a time of purchase of the first Internet purchase card;
    receiving, from the user and subsequent to the user purchasing the first Internet purchase card, second security information via the Internet, wherein the second security information includes security information other than the first security information and wherein the second security information replaces part of the first security information;
    providing, by the control module, an acknowledgement message indicating that the second security information has been accepted;
    receiving, from the user, a request for payment associated with the Internet related purchase, wherein the request for payment includes the first security information and the second security information;
    prior to implementing a fund transfer for the Internet related purchase, an Internet card control network checking to determine if an amount of funds available via the first Internet purchase card to pay for the purchase exceeds a purchase amount corresponding to the Internet related purchase;
    determining that the amount of funds available via the first Internet purchase card to pay for the purchase is less than the purchase amount; and
    prompting the user, via the Internet card control network and in response to determining that the amount of funds available via the first Internet purchase card to pay for the purchase is less than the purchase amount, to supply information corresponding to a second Internet purchase card, wherein the second Internet purchase card is a different card than the first Internet purchase card.

2. The method of claim 1, further comprising:
    adding at least some of the amount of funds on said second Internet purchase card to the amount of funds on said first Internet purchase card to pay for the purchase.

3. The method of claim 2, further comprising:
    checking to determine whether the total amount of funds available via the first and second Internet purchase cards exceeds the purchase amount.

4. The method of claim 3, further comprising:
    not implementing a fund transfer in response to determining that said total amount of funds to pay for the purchase is less than said purchase amount.

5. The method of claim 3, further comprising:
    implementing a fund transfer in response to determining that said total amount of funds available via the first and second Internet purchases cards to pay for the purchase at least equals said purchase amount.

6. The method of claim 1, wherein the second security information comprises a personal identification number or a password.

7. The method of claim 1, wherein the second security information supplements the first security information.

8. The method of claim 1, further comprising:
    verifying, by the Internet card control network, that the second security information is valid.

9. A system, comprising:
    a memory device comprising a database configured to store information associated with a plurality of purchase cards;
    an activation module configured to:
    receive information from a purchase card retailer associated with a first one of the plurality of purchase cards, wherein the first card includes first security information that is hidden at a time of sale of the first card by packaging, a scratch-off coating or a peel-off covering, and update the database to indicate that the first card is active; and an interface module configured to:
receive second security information from a user associated with the first card, the second security information supplementing the first security information and replacing part of the first security information,
send a message to the user confirming acceptance of the second security information, and
store the second security information in the database.

10. The system of claim 9, wherein the interface module is further configured to:
transfer activated card record information for the first card to at least one of a credit card or debit card network.

11. The system of claim 10, wherein when transferring activated card record information, the interface module is configured to:
transfer the second security information to the credit card or debit card network.

12. The system of claim 10, wherein the interface module is further configured to:
receive an acknowledgement message from the credit card or debit card network indicating the successful transfer of the activated card record information for the first card.

13. The system of claim 9, wherein the database includes card identification information, security information that is hidden at a time of sale of the first card by packaging, a scratch-off coating or a peel-off covering, user supplied security information, card seller identification information, card denomination information, an amount remaining and purchase information for the first card.

14. The system of claim 9, further comprising:
an account administration module configured to:
respond to authorization requests for funds from financial networks,
make authorization decisions regarding the authorization requests, and
update the database based on the authorization decisions.

15. The system of claim 14, wherein the account administration module is further configured to:
receive information from a first retailer regarding a potential purchase using the first card,
determine whether an amount of funds available via the first card to pay for the potential purchase is less than a purchase amount, and
signal the first retailer, in response to determining that the amount of funds available via the first card is less than the purchase amount, to prompt the user to supply information corresponding to a second purchase card, wherein the second purchase card is a different card than the first card.

16. The system of claim 15, wherein the account administration module is further configured to:
determine whether a total amount of funds available via the first and second cards exceeds the purchase amount.

17. The system of claim 9, wherein the second security information replaces a portion of the first security information.

* * * * *